(12) United States Patent
Yu et al.

(10) Patent No.: US 9,239,707 B2
(45) Date of Patent: Jan. 19, 2016

(54) MODEL FRAMEWORK FOR APPLICATIONS

(71) Applicants: Mei Yu, So. San Francisco, CA (US); Angus Dunn, Fremont, CA (US)

(72) Inventors: Mei Yu, So. San Francisco, CA (US); Angus Dunn, Fremont, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 238 days.

(21) Appl. No.: 13/930,413

(22) Filed: Jun. 28, 2013

(65) Prior Publication Data
US 2015/0007128 A1 Jan. 1, 2015

(51) Int. Cl.
*G06F 9/44* (2006.01)

(52) U.S. Cl.
CPC .. *G06F 8/24* (2013.01); *G06F 8/36* (2013.01); *G06F 8/38* (2013.01)

(58) Field of Classification Search
None
See application file for complete search history.

(56) References Cited

U.S. PATENT DOCUMENTS

| | | | | |
|---|---|---|---|---|
| 6,950,850 | B1 * | 9/2005 | Leff et al. | 709/203 |
| 6,973,640 | B2 * | 12/2005 | Little et al. | 717/106 |
| 7,058,940 | B2 * | 6/2006 | Calahan | 717/167 |
| 7,289,964 | B1 * | 10/2007 | Bowman-Amuah | 705/1.1 |
| 7,317,959 | B2 * | 1/2008 | Pfander et al. | 700/97 |
| 7,469,402 | B2 * | 12/2008 | Bender et al. | 717/121 |
| 7,506,306 | B2 * | 3/2009 | Huang et al. | 717/113 |
| 7,519,976 | B2 * | 4/2009 | Blevins | 719/328 |
| 7,587,608 | B2 | 9/2009 | Haller et al. | |
| 7,823,070 | B2 * | 10/2010 | Nelson et al. | 715/747 |
| 7,917,915 | B2 | 3/2011 | Bonnette et al. | |
| 8,069,437 | B2 | 11/2011 | Aigner et al. | |
| 8,261,231 | B1 | 9/2012 | Hirsch et al. | |
| 8,281,283 | B2 | 10/2012 | Speth et al. | |
| 8,522,213 | B2 * | 8/2013 | Fuhrer et al. | 717/125 |
| 8,555,085 | B2 | 10/2013 | Khoury | |
| 2002/0133812 | A1 * | 9/2002 | Little et al. | 717/140 |
| 2003/0005019 | A1 | 1/2003 | Pabla et al. | |
| 2005/0188353 | A1 * | 8/2005 | Hasson et al. | 717/116 |
| 2005/0246681 | A1 * | 11/2005 | Little et al. | 717/106 |
| 2005/0273759 | A1 | 12/2005 | Lucassen et al. | |
| 2006/0095439 | A1 * | 5/2006 | Buchmann et al. | 707/100 |
| 2006/0129781 | A1 * | 6/2006 | Gellai et al. | 711/170 |
| 2006/0212864 | A1 * | 9/2006 | Calahan | 717/167 |
| 2007/0106982 | A1 * | 5/2007 | Dalal et al. | 717/128 |
| 2008/0028364 | A1 * | 1/2008 | Triou et al. | 717/104 |
| 2009/0150680 | A1 | 6/2009 | Buchanan et al. | |
| 2009/0150970 | A1 | 6/2009 | Hinds et al. | |
| 2010/0017812 | A1 | 1/2010 | Nigam | |
| 2010/0131916 | A1 * | 5/2010 | Prigge | 717/104 |
| 2011/0185340 | A1 * | 7/2011 | Trent et al. | 717/104 |
| 2012/0017201 | A1 * | 1/2012 | Rajan et al. | 717/132 |
| 2012/0291017 | A1 * | 11/2012 | Fuhrer et al. | 717/125 |
| 2013/0166920 | A1 | 6/2013 | Cousins et al. | |
| 2013/0318498 | A1 | 11/2013 | Mittal et al. | |
| 2014/0026113 | A1 | 1/2014 | Farooqi | |
| 2014/0214779 | A1 * | 7/2014 | Francis | 707/693 |

\* cited by examiner

*Primary Examiner* — Don Wong
*Assistant Examiner* — Roberta E Luna
(74) *Attorney, Agent, or Firm* — Fountainhead Law Group P.C.

(57) ABSTRACT

A model framework is used to implement the model component of application using a model-view-controller design pattern. The model framework provides built-in functionality that defines a default behavior. Application programming interfaces (APIs) allow an application developer to modify the default behavior of the model framework in a manner that suits the data model of the application.

20 Claims, 5 Drawing Sheets

MODEL FRAMEWORK FOR APPLICATIONS

BACKGROUND

Unless otherwise indicated herein, the approaches described in this section are not prior art to the claims in this application and are not admitted to be prior art by inclusion in this section.

Business applications typically execute on application servers in the enterprise, using the client computer largely to support only the user interface. Such clients have been referred to as "thin" clients to reflect that virtually all of the business application functionality is provided in the application server. In web-based business applications, some of the business logic has migrated to the client machine, using web interface technology such as web services description language (WSDL), simple object access protocol (SOAP), and the like to support higher levels of functionality on the client.

As the processing power of mobile devices continues to increase, more and more of the business logic is being migrated down to the mobile device. For this reason, mobile devices, such as computer tablets, smartphones, and the like, are sometimes referred to as "rich" clients because of the rich set of features that mobiles device can support in a business application. Placing the business logic on the mobile device creates challenges in the design and implementation of mobile business applications, including secured access to data at the backend servers, data security in the mobile device, integrity of the business data, ensuring data is up to date, and so on.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
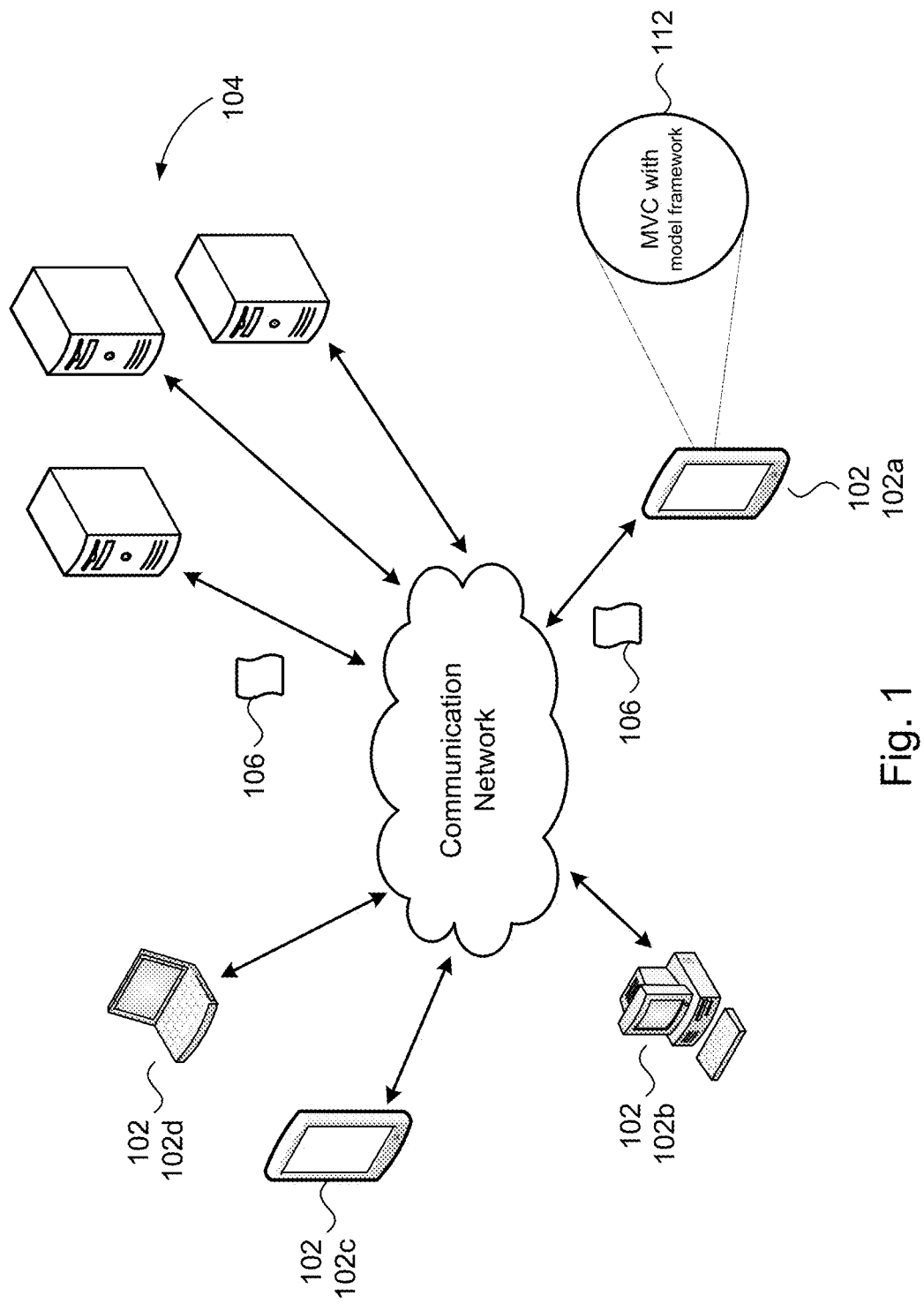
FIG. 1 is a system level overview the operating environment of the present disclosure.

FIG. 1 shows a computing environment in accordance with some embodiments of the present disclosure. The computing environment may include various computing devices 102 in communication with backend servers 104 of a business enterprise over a communication network. The computing devices 102 may be any suitable computer system including mobile computing devices 102a, 102c (e.g., computer tablets, smartphones, etc.), desktop computers 102b, laptop computers 102d, and so on. The backend servers 104 may comprise server systems typical in an enterprise. Backend servers 104 may include customer relationship management (CRM) systems, enterprise resource planning (ERP) systems, human capital management (HCM) systems, Supply Chain Management (SCM) systems, and so on. Typically, there will be an exchange of information 106 between the computing devices 102 and the backend systems 104, including the backend system sending data to a computing device and vice-versa.

Applications 112 running on the computing devices 102 include business applications which access the various enterprise backend systems 104. Applications 112 may be targeted for the business user (e.g., sales person) or for the customer (e.g., to place orders, check up on the progress of a purchase, and so on). It will be appreciated of course that applications 112 may be other than business applications. As will be explained in more detail below, applications 112 running on the computing devices 102 are based on a design pattern referred to as model-view-controller (MVC) and a model framework.

Figure 2:
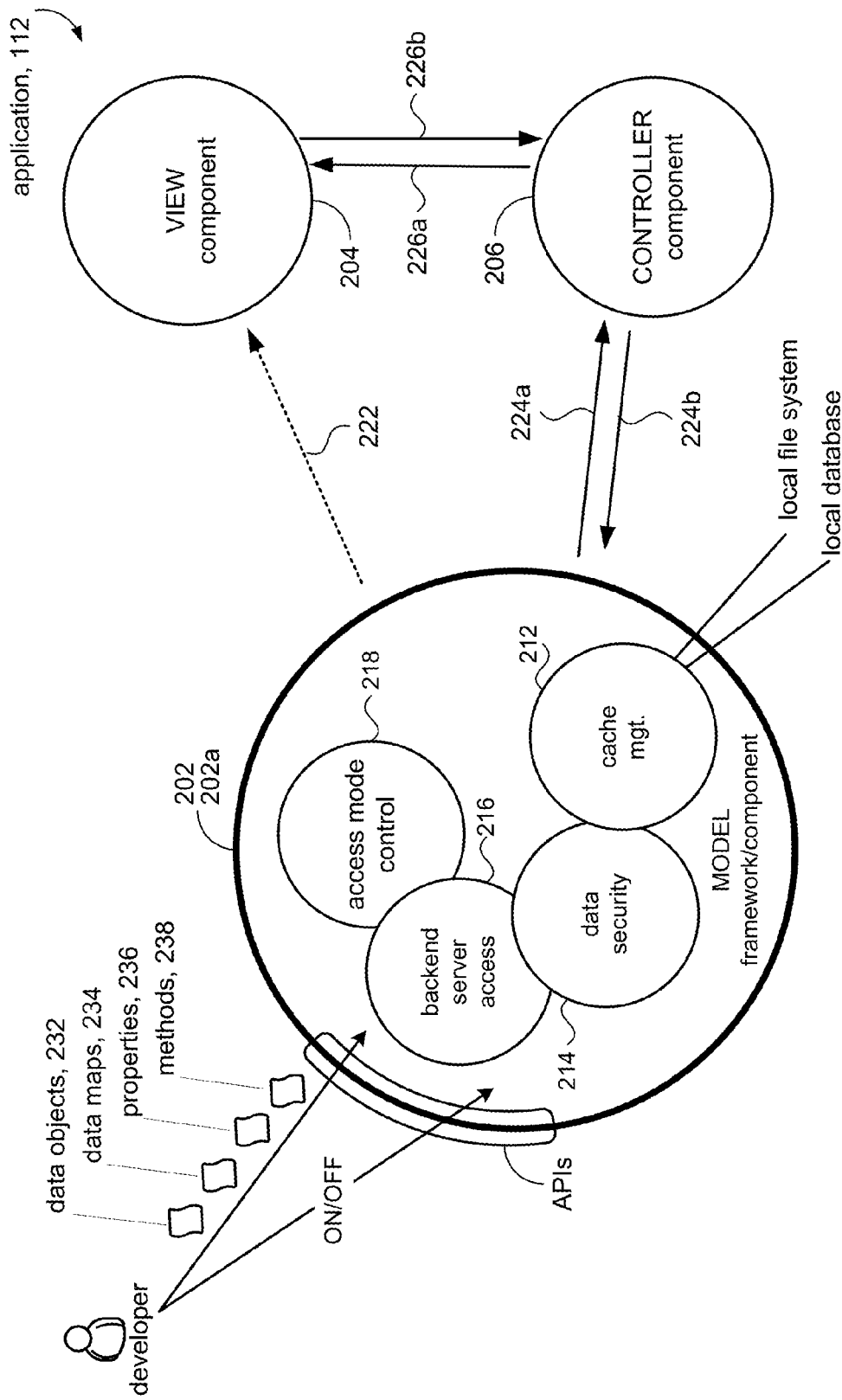
FIG. 2 illustrates the model framework in the context of a model-view-controller design pattern.

Referring now to FIG. 2, applications 112 in accordance with the present disclosure may be designed using the MVC design pattern. The MVC design pattern is suitable for "rich" clients in which most of the functionality of a particular application is provided on the client side, rather than being provided on a server system (e.g., application server) where the client largely serves as an input/output device. The MVC design pattern is suitable when it is desirable to isolate the details of the business logic and data processing from the user interface. MVC identifies three components: the model component 202, the view component 204, and the controller component 206. The model component 202 models the data (data model) and represents business rules used to access and manipulate the data. The model component 202 also manages the overall behavior of the application. The model component 202 may send notifications 222 to the view component 204 about changes in the data. Notifications 224a, likewise, may be sent to the controller component 206. The model component 202 may respond to actions 224b initiated in the controller component 206.

The view component 204 manages the graphical and/or textual output to the user, namely the user interface (UI). For example, in a graphical UI (GUI), the view component 204 is typically responsible for providing text input boxes, checkbox items, radio buttons, and the like. The controller component 206 receives and interprets user inputs, such as mouse and keyboard inputs, and initiates activity in the model component 202 to change the data as appropriate; e.g., by invoking suitable program code (e.g., functions, methods, etc.) in the model component. The view component 204 and controller component 206 may send notifications 226a, 226b between each other.

In accordance with the present disclosure, the model component 202 may be built using a model framework 202a. The model framework 202a is a software framework comprising a functional backbone of program code that drives the workflow in the model component 202. A model framework 202a according to the present disclosure has the following characteristic features that distinguishes it from libraries or normal user applications:

inversion of control—Unlike in libraries or normal user applications, the overall flow of control in the model framework is not dictated by a caller (e.g., actions 216 initiated by the controller component 206), but rather by the internal structure and interconnections of the program code that comprises the model framework.
  default behavior—The model framework has a default behavior that performs substantive activity, rather than executing no-ops or other trivial code.

extensibility—Functionality provided by the model framework can be specialized/overridden by user-provided configurations of the constituent program code and/or by externally provided program code.

non-modifiable program code—The program code that comprises the model framework is not allowed to be modified by users. As noted above, users can extend the provided functionality of the model framework, but they cannot modify its skeleton program code.

In some embodiments, the program code comprising the model framework 202a provides a set of built-in functions, which collectively define the default behavior of the framework. That is, absent any externally provided overriding functions and user customizations or configuration (described below), the model framework 202a can provide the default functionality to the model component 202. In some embodiments, for example, the default functionality may include built-in functionality that includes cache management 212, data security 214, backend server access 216, access mode control 218, and so on. The program code provides methods that constitute the functionality 212-218. Absent any user customizations to the initial configuration, the built-in functions can operate in a default mode. FIG. 2 represents an initial configuration, prior to user configuration of the model framework 202a, where the model component 202 and the framework are the same.

The cache management 212 functionality may provide methods for managing the caching of data objects to a local memory or local data store (e.g., cache memory) of the computing device 102, for example to provide a local file system and/or a local database. Cache management 212 may include functionality such as data refresh and data expiration. Some data may need to be refreshed periodically, and so the cache management services 212 may include methods which execute on the computing device 102 as background processes to periodically access the backend servers 104 to obtain "current" copies of the data. Some data may need to be "expired" after a period of time. For example, a status chart for an ongoing project may be marked for daily expiration in order to ensure that the user is presented with up to date information. When such data expires, a method provided by the cache management services 212 may delete the data and cause fresh data to be retrieved from the backend servers 104. As a default behavior, for example, the cache management 212 may never expire data.

Cache management 212 may include functionality to manage, in conjunction with access mode control 218, how data is accessed (stored and/or read out) between local memory, local data stores, and over the network. For example, based on an access mode, the cache management 212 may access data only from local memory or always over the network. As a default behavior, for example, the cache management 212 may always access data locally.

Data security 214 may provide data security measures to protect user data and enterprise data. The data security 214 may include methods for encrypting and decrypting data. For example, data persisted on the local file system or local database may be encrypted, and so the data security 214 may include decryption methods in order to decrypt the data prior to consumption by the application. Conversely, data received from a user may need to be encrypted, and so the data security 214 may include encryption methods. The data security 214 may manage one or more cryptographic keys.

The data security 214 may include methods for purging some or all of a user's data. For example, when a user quits the application 112 (e.g., by logging out, being timed out, etc.) the data security 214 may purge the local memory and the data store of all the user's data. If the cryptographic keys are modified, the data security 214 will decide how to process already encrypted data. As a default behavior, for example, the data security 214 may always purge the encrypted data (and thus force the data to be fetched again from a backend server, for example).

In some embodiments, the data security 214 may use data security features provided by the computing device 102. For example, the operating system (OS) on the computing device 102 may provide an application programming interface (API) to access cryptographic hardware provided on the computing device.

The backend server access 216 may provide functionality for accessing and communicating with the backend servers 104 to retrieve and store data. Methods provided by the backend server access 216 may include, for example, logging on to the backend servers and interacting with them to retrieve and store data. The backend server access 216 may include retry logic when access to the backend servers 104 cannot be made. The retry logic may buffer (queue) up network access requests (e.g., requests to write data to the backend servers 104, or to access data from the backend servers), so that when communication with the backend servers is established the buffered requests can be processed.

An advantage of the model framework 202a is that the framework provides a set of core functionality and workflow that is common for a given domain of applications. The model framework 202a provides an architectural backbone, which provides behavior that is common to the given domain of applications. For example, mobile applications running on rich mobile clients (e.g., computer tablets, smartphones) may have a set of common requirements such as cache management, data security, and so on. The model framework 202a can provide that common structure.

When the model framework 202a is initially developed, fully tested, and released, application developers who use the framework can assume they have a stable foundation on which to build their specific applications. The program code comprising the model framework 202a may be considered "frozen" or locked. This is another distinguishing characteristic of a framework, the program code comprising the model framework 202a is not allowed to be modified. For example, per policies of the enterprise in which the application is being developed, application developers may not be permitted to modify the framework's code. As such the code remains stable.

Another distinguishing characteristic of the model framework 202a is that although a developer is not permitted to modify its constituent program code, an application developer may nonetheless customize the behavior of the framework or override some functionality of the framework. While the model framework 202a can function in its default mode, a specific application is likely to require certain customizations in order to be useful.

As illustrated in FIG. 2, in accordance with the present disclosure, the model framework 202a may include application programming interfaces (APIs) to expose parts of the framework code so that an application developer can customize the framework. A simple customization of the model framework 202a, for example, is to turn ON (enable) or turn OFF (disable) a particular built-in function 212-218. The model framework 202a may allow the developer to override some of the default functionality provided by the built-in functions 212-218, to change the framework's default behavior, and so on.

The model framework 202a defines generic internal data objects. However, in order to model the specific data objects of an application (e.g., application 112), the developer will typically provide definitions (e.g., class definitions) of data objects 232 that are specific to the application for which the model framework is being customized. For example, an email application may require various classes of email data objects that need to be defined by the developer.

The developer may customize the behavior of the model framework 202a in connection with the way that data is mapped between the framework's internal data objects and the application-specific data objects. For example, data objects retrieved from the backend server 104 are likely to have a different structure (data scheme) than the data objects of the application. Accordingly, the developer may customize the model framework 202a by providing data mappings 234, which process data objects received from the backend servers 104 and maps or transforms the data into the application-specific data objects. The data mappings 234 also provide mapping from the application-specific data objects to the framework generic data objects, which are used to encrypt and persist the data in the local memory.

The developer may provide properties 236 to the model framework 202a to customize the behavior of the framework. For example, data expiration may be set to a default value of 0 (data does not expire). This default behavior may not be suitable for a particular application, and so the developer may specify a property 236 that sets the data expiration time in the model framework 202a to an appropriate value.

Another customization that can be performed is to provide program code that a developer writes to override some default processing the model framework 202a performs. While the program code that implements the functionality 212-218 of the model framework 202a is not modifiable by the developer (i.e., the model framework is frozen), the developer may nonetheless override the functionality using one or more override methods 238

Figure 2A:
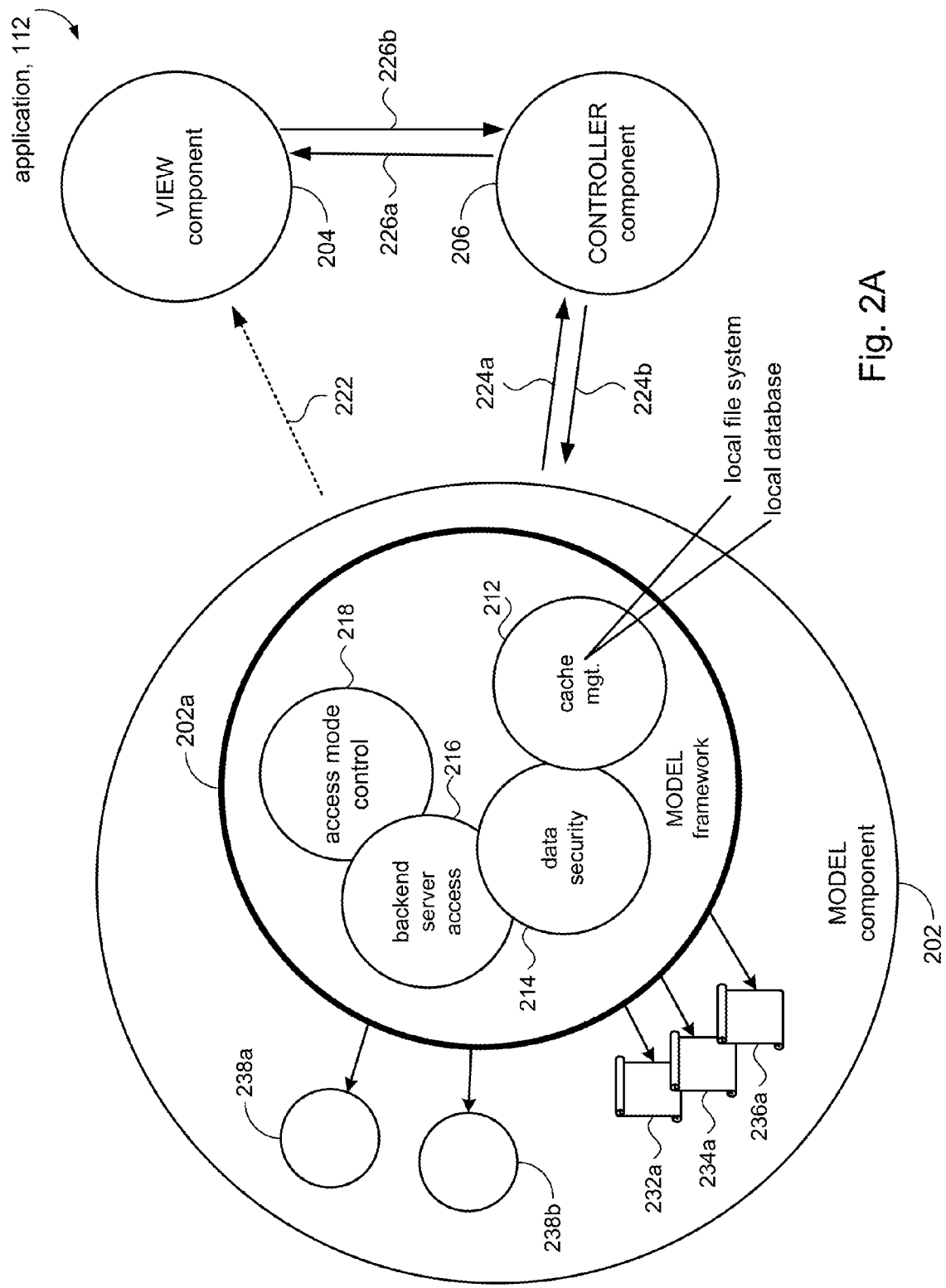
FIG. 2A illustrates the model framework configured to implement the model component of a model-view-controller design.

FIG. 2A illustrates an example of the extension of the model framework 202a to build a practical model component 202. The figure shows the model framework 202a as providing much of the functionality of the model component 202, along with various customizations. The model component 202 may now be viewed as comprising the model framework 202a customized for the data model that is specific to the application 112. For example, the customized configuration may include data objects 232a specific to the application, data mapping(s) 234a to map between the application-specific data objects and data objects in the model framework 202a, properties 236a that are suitable for the application 112, override methods 238a, 238b, and so on.

Figure 3:
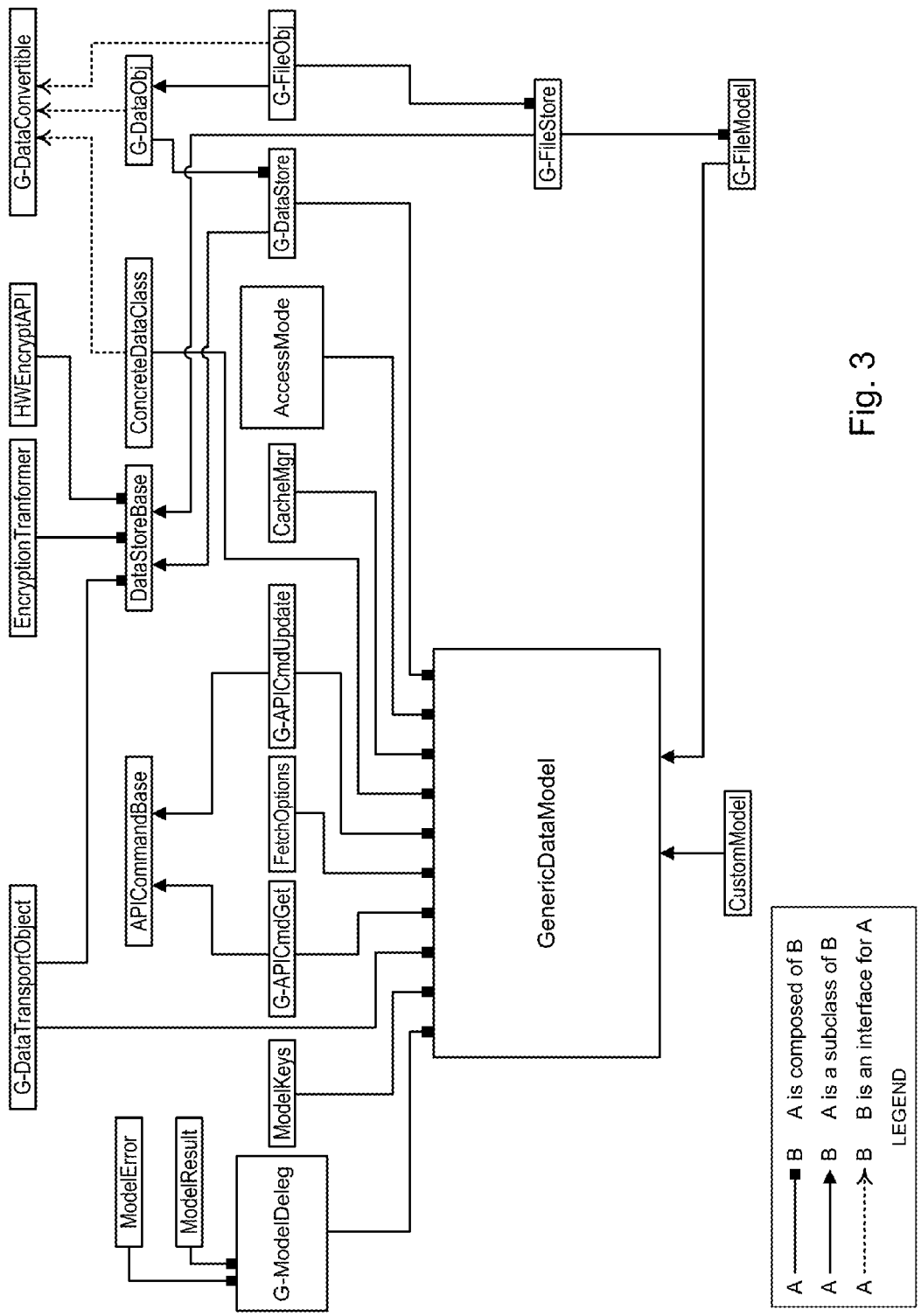
FIG. 3 shows a class diagram of an embodiment of a model framework in accordance with the present disclosure.

In some embodiments, the model framework 202a may be provided as a set of objects comprising member variables, methods, public APIs, and so on. FIG. 3 shows an illustrative example of a model framework 202a implemented as a set of object classes. The figure represents the model framework 202a using a class diagram showing various object classes comprising the model framework 202a. It will be appreciated although FIG. 3 highlights several of the class objects comprising model framework 202a, the figure is not intended to be a complete representation of the framework.

The GenericDataModel class is the main object class for the model framework 202a. It is composed of (contains) other object classes depicted in FIG. 3. The figure includes a legend that can be used to identify contained classes, and other relationships shown in the class diagram.

The GenericDataModel class includes methods defined within the class and methods inherited from the contained classes. In accordance with the present disclosure, the methods provided in the GenericDataModel class include methods that allow the application developer to configure the model framework 202a as explained above, and more particularly APIs that expose those methods to the application developer. For example, in some embodiments, the APIs may include:

setDataClass—This API allows the application developer to define and otherwise specify the data objects that are specific to the application 112, which are modeled by the model component 202.

setKeys—This is API defines a set of keys that are used to specify the data. For example, in a database, the "key" may be a primary key used to fetch records from the database. Generally, this API defines unique search keys for searching data.

setAPIGetURI—This API sets one or more universal resource identifiers (URIs) for retrieving data from a network server, such as backend servers 104. As will be explained below, in some embodiments the URI may not be defined. Instead, the application developer may define a subclass of the G-APICmdGet class. The developer may then define their own specific methods for retrieving data.

setAPIUpdateURI—This API sets one or more URIs for updating data to a network server. In some embodiments, the URIs for retrieving data may be different from the URIs for updating data. In other embodiments, the URIs may be the same. In some embodiments the URI may not be defined. Instead, the application developer may define a subclass of the G-APICmdUpdate class. The developer may then define their own specific methods for updating data.

setExpiration—This API sets how long locally stored data is valid for. The default behavior can to be to never expire locally stored data.

setAccessMode—This API sets how the data is accessed (e.g., writing or reading). The default behavior can be to always store data in the local memory (e.g., cache memory). Access modes will be discussed in more detail below in connection with the AccessMode enumerated class.

setNotification—This API turns ON or OFF notifications when the state of data changes. Notifications may be sent to the viewer component and/or to the controller component. For example, a notification sent to the viewer component may cause the viewer component to update a display that is presented to the user. The default behavior can be to never send notifications.

onLocaleChanged—This API allows the developer to provide a method that overrides the default method for handling a change in location. When the location of the computing device 102 changes, the default response may be to purge all the data. For example, detection of a change in location may be accomplished using GPS information on the computing device 102.

onLowMemory—This API allows the developer to provide a method that overrides the default method for handling a low memory situation. For example, when memory is low, the default response may be to purge the cached data.

onEncryptionKeyChanged—This API allows the developer to provide a method that overrides the default method for changing one or more cryptographic keys. For example, when a cryptographic key is changed, the default response may be to purge the data.

create—This API allows the developer to provide a method for creating new application-specific data objects.

fetch—This API allows the developer to provide a method to read data that match search keys (e.g., defined using setKeys).

fetch [with FetchOptions]—This API allows the developer to provide a method to read data that match data searched using search criteria (e.g., defined in a FetchOptions class described below) other than the search keys.

update—This API allows the developer to provide a method to update one or more data objects that match the search key (e.g., defined using setKeys).

update [with FetchOptions]—This API allows the developer to provide a method to update one or more data objects that match data searched using search criteria (e.g., defined in a FetchOptions class described below) other than the search keys.

delete—This API allows the developer to provide a method to delete one or more data objects that match the search key (e.g., defined using setKeys).

delete [with FetchOptions]—This API allows the developer to provide a method to delete one or more data objects that match data searched using search criteria (e.g., defined in a FetchOptions class described below) other than the search keys.

Continuing with FIG. 3, the CustomModel represents a subclass that the developer may define to create the model framework 202a that is specific to the application 112 that they are developing. The CustomModel subclass inherits the methods of the GenericDataModel. It will be appreciated of course that the name of the subclass may be something other than CustomModel; for example, if the application 112 is an email client, then the subclass may be called EmailModel.

A generic model delegator interface called G-ModelDel provides a group of event handling methods. The developer may provide methods to handle various events, for example:
onFetchSuccess—This method provides processing for processing a successful fetch.
onFetchFail—This method provides processing for processing a failed fetch.
onUpdateSuccess—This method provides processing for processing a successful update operation.
onUpdateFail—This method provides processing for processing a failed update operation.

A ModelKeys class provides the search keys that may be used to search data; e.g., databases in the backend servers 104. Keys defined in this class, for example, may be the primary keys in the database tables of a database. They are "keys" in that they uniquely identify the date records in a database; e.g., a customer ID, an invoice number, an email address, and so on.

A class called G-DataTransportObject defines generic data transport objects used by the model framework 202a. The generic data transport objects are internal data objects that the model framework 202a uses to store data to the local database or local files The developer is not allowed to directly access the local data stores such as the local file system and local database instead, data is mapped between the generic data transport objects and the data objects that are specific to the application.

A class called APICommandBase is a base class that provides the basic methods for retrieving and updating data in the backend servers 104. The G-APICmdGet class and the G-APICmdUpdate class described above are actually subclasses of the APICommandBase class. The G-APICmdGet and G-APICmdUpdate subclasses encapsulate all the logic for communicating with the backend servers 104. As explained above, the developer may configure properties of the G-APICmdGet and G-APICmdUpdate subclasses; e.g., specify URI's. Or, the developer may define subclasses from G-APICmdGet and G-APICmdUpdate and provide customized methods for retrieving and updating data on the backend servers 104.

A class called FetchOptions allows the developer to define search criteria other than a search key. Whereas search keys uniquely identify data records in a database, the search criteria defined in the FetchOptions class typically are not unique, and a search may result in multiple hits. If no search criteria are defined, the default behavior is to search using the search keys defined in the ModelKeys class.

Data security may be provided by the encryption and decryption classes called EncryptionTransformer and HWEncryptAPI. The EncryptionTransformer class provides methods for encrypting and decrypting data. The HWEncryptAPI class refers to cryptographic methods provided by the OS of the computing device 102; e.g., using API calls into the OS.

The DataStoreBase is a base class that provides basic methods for the subclasses G-DataStore and G-FileStore. The G-DataStore subclass defines a generic data store that is used by the model framework 202a to store data objects. The data objects stored in the generic data store are defined in the G-DataObj class, which define data objects specific to the model framework 202a. The G-FileStore subclass defines a generic file store that is intended to store large files. Data objects stored in a file may be restructured or otherwise modified to be more suitable for being stored in a file format. The data objects for storing data in the generic file store are defined in the G-FileObj class, which define data objects specific to the model framework 202a.

The ConcreteDataClass defines classes of data objects that are specific to the application. The setDataClass API mentioned above is invoked to define the data objects that comprise the ConcreteDataClass class.

As explained above, the G-DataTransportObject class holds data holds data mapped from application-specific data. The model framework 202a will move data between the G-DataTransportObject data objects and its internal G-DataObj and G-FileObj data objects. The G-DataConvertible class is an interface that provides a group of methods for mapping data between the application-specific data objects defined in the ConcreteDataClass class and the G-DataObj and G-FileObj data objects of the model framework 202a.

The CacheMgr class is a manager class for managing the storage of the various data classes of the model framework 202a, including storing data in a cache memory of the computing device 102. The methods in this class operate in accordance with an access mode selected from the AccessModes enumerated class, which can be done using the setAccessMode API. Thus, the selected access mode can vary the behavior of the CacheMgr. In a particular implementation, for example, the CacheMgr class manages data objects in memory only. All data managed through the model framework 202a is cached in local memory by default.

The AccessModes enumerated class defines different types of data access. For example, InMemory access mode tells the model framework 202a to store data only in the local memory (e.g., cache memory). This access mode may be suitable if there is no need or desire to ever access the network, and to provide the fastest response time by not storing data the data in the data store (e.g., a database) but only in the local cache. The default behavior may be the InMemory access mode.

Higher levels of access modes build on the lower access mode levels. Thus, for example, DataStore access mode tells the model framework 202a to store data in the local memory and in a data store (e.g., the subclasses G-DataStore and G-FileStore). Data may then be accessed, first from the local memory. If the data in the local memory has expired, then the data is accessed from the data store. In Network access mode, data retrieval is made over the network at the backend servers 104 if the data has expired in the local memory and in the data store.

The NetworkNow access mode tells the model framework 202a to fetch data directly from the backend server 104 rather than from local memory or the data store, thus ignoring any data that may be stored in local memory or the data store. This may be appropriate when up to date data is required. If the network is not available, then the model framework 202a may raise an error; e.g., invoke the onFetchFail method mentioned above.

The NetworkEventually access mode is suitable for data that is needed, but not right away. Thus, if the network or backend servers 104 are not available, the model framework 202a will not raise an error. Rather, the model framework 202a will queue a data retrieval request and process the request in a background process when network access is restored. In the meanwhile, the model framework 202a may retrieve whatever data is available in the local memory or data store.

Figure 4:
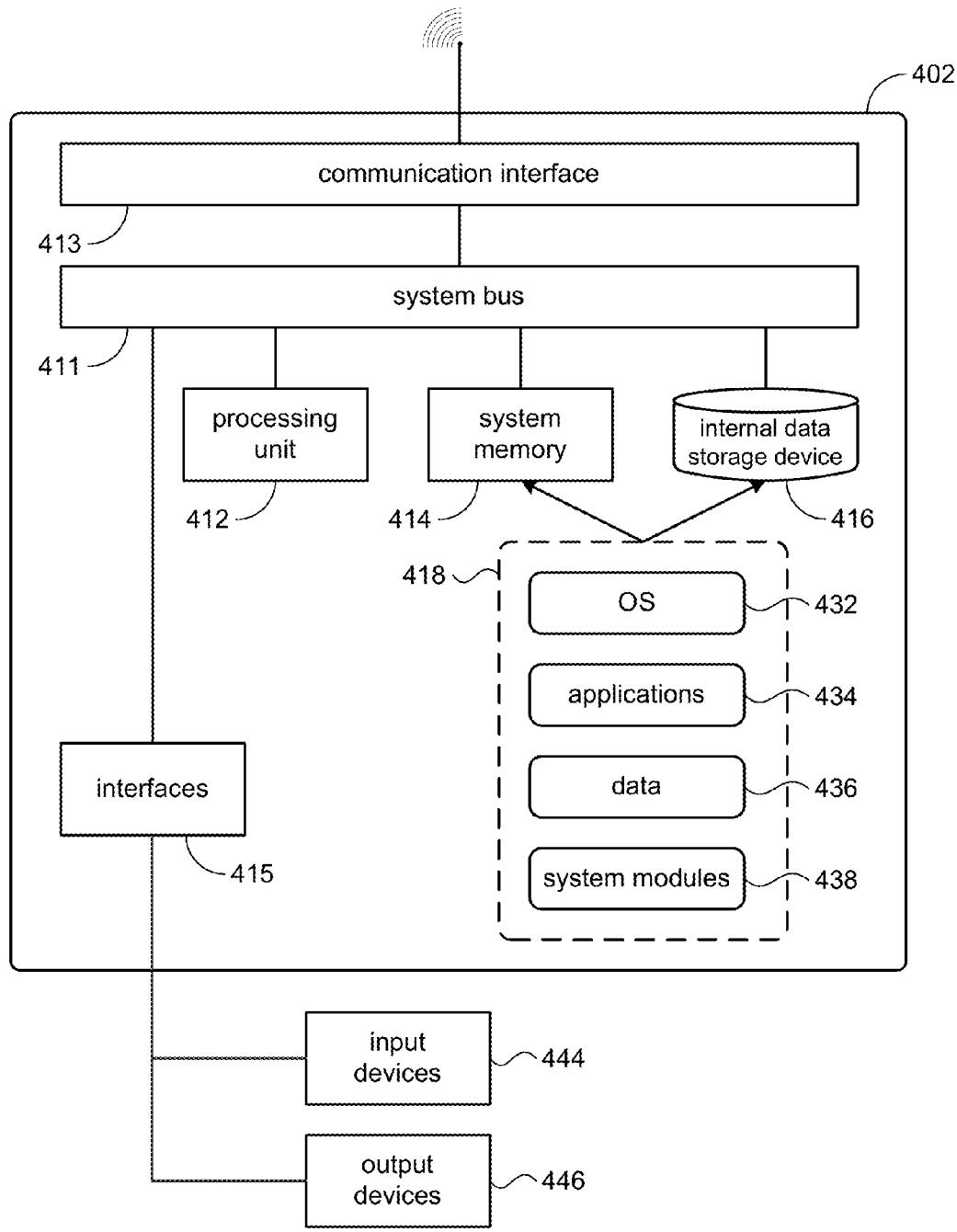
FIG. 4 shows an illustrative implementation in accordance with the present disclosure.

Referring to FIG. 4, an illustrative implementation of computing device 102 may include a computer component 402 having a processing unit 412, a system memory 414, and a system bus 411. The system bus 411 may connect various system components including, but not limited to, the processing unit 412, the system memory 414, an internal data storage device 416, and a communication interface 413.

The processing unit 412 may comprise a single-processor configuration, or may be a multi-processor architecture. The system memory 414 may include read-only memory (ROM), random access memory (RAM), and/or high speed cache memory. The internal data storage device 416 may be an internal hard disk drive, a magnetic floppy disk drive, an optical disk drive, and so on. In a configuration where the computing device 102 is a mobile device (e.g., smartphone, computer tablet), the internal data storage device 416 may be a large capacity flash memory. The internal data storage device 416 may serves as a non-transitory computer-readable storage medium to provide nonvolatile storage of data, data structures, a local file system, a local database, computer-executable instructions, and so on.

The system memory 414 and/or the internal data storage device 416 may store a number of program modules, including an operating system 432, application program code 434, program data 436, and other program/system modules 438. The program data 436 may comprise object class definitions comprising the model framework 202a, generic data object of the model framework, application-specific data objects, and so on.

In accordance with the present disclosure, the application program code 434 may include code that comprises the viewer component, controller component, and model component of application 112. The program code 434 may further include code that constitutes methods of the model framework 202a and application-specific methods. The program code 434 may include APIs that allow the model framework 202a to be customized with application-specific methods. The program code 434, when executed by the computer component 402, may cause the computer component to perform in the manner described herein.

Access to the computer component 402 may be provided by a suitable input device 444 (e.g., keyboard, mouse, touch pad, etc.) and a suitable output device 446, (e.g., display screen). In a configuration where the computing device 102 is a mobile device, input and output may be provided by a touch sensitive display.

The computing device 102 may operate in a networked environment using logical connections via wired or wireless communications to one or more backend servers 104 over a communication network.

Advantages and Technical Effect

Advantages of the model framework include, in addition to advantages mention above, reducing overall development cost because the model framework provides a common framework for developing the model component in a model-view-controller based design. The model framework is developed and well tested. The underlying program code is inaccessible to the application developer and so the model framework remains stable from one application to another. The model framework can be tuned for performance without affecting already written applications.

The model framework encourages developers to follow a test driven development process. A model (e.g., model component 202) built using the model framework 202a is easy to write a unit test for and the developer can easily simulate network server communications by overriding the execute methods in the G-APICmdGet and G-APICmdUpdate subclasses. In a particular implementation, for example, the model framework 202a itself comprises more than 90% unit test coverage.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A computing device comprising:
a central processing unit (CPU); and
a memory having stored thereon an application that uses a model-view-controller design pattern, and which comprises a model component, a controller component, and a viewer component, the model component implemented using a model framework,
the model framework comprising one or more first application programming interfaces (APIs) that provide application specific configuration data to first program code comprising the model framework, which, when executed by the CPU, causes the model component to use the application specific configuration data,
the model framework comprising one or more second APIs to alter processing in second program code comprising the model framework, wherein the second program code, which, when executed by the CPU, causes the model component to exhibit default behavior, wherein the second program code having one or more changed properties, when executed by the CPU, causes the model component to exhibit one or more changes in the default behavior,
the model framework comprising one or more third APIs to provide create, read, update, and delete (CRUD) program code to the model framework that is specific to data objects of the application, wherein the CRUD program code, when executed by the CPU, causes the CPU to manage the data objects in a manner that is specific to the application.

2. The computing device of claim 1 wherein the model framework comprising third program code, which, when executed by the CPU, causes the CPU to respond to actions initiated by the controller component.

3. The computing device of claim 2 wherein the model framework comprising fourth program code, which, when executed by the CPU, causes the CPU to send notifications to the viewer component in response to processing some of the actions initiated by the controller component.

4. The computing device of claim 1 wherein one of the first APIs is an API that defines application specific data objects.

5. The computing device of claim 1 wherein one of the first APIs is an API that specifies one or more key fields to identify application specific data.

6. The computing device of claim 1 wherein one of the first APIs is an API that specifies one or more Internet addresses for communicating with one or more backend servers over a communication network to access data.

7. The computing device of claim 1 wherein the default behavior includes expiring data stored in the memory after a first period of time has elapsed, wherein one of the second APIs is an API to replace the first period of time with a second period of time, thereby changing when data is expired.

8. The computing device of claim 1 wherein the default behavior includes how data is stored and accessed in the memory, wherein one of the second APIs is an API to change how data is stored and accessed in the memory.

9. The computing device of claim 1 wherein the default behavior includes not sending a notification to the controller component or to the viewer component when a state of data stored in the memory has changed, wherein one of the second APIs is an API to enable sending notifications to the controller component or to the viewer component when the state of the data has changed.

10. The computing device of claim 1 wherein the default behavior includes expiring data when a location of the computing device changes, wherein one of the second APIs is an API to replace some of the second program code with replacement program code to handle the data in an application-specific manner, other than expiring the data, when the location of the computing device changes.

11. The computing device of claim 1 wherein the default behavior includes purging data stored in a cache memory of the computing device when a low memory condition arises, wherein one of the second APIs is an API to replace some of the second program code with replacement program code to handle the data in the cache memory in an application-specific manner, other than purging the data, when the low memory condition arise.

12. The computing device of claim 1 wherein the default behavior includes purging encrypted data when one or more encryption keys stored in the computing device have changed, wherein one of the second APIs is an API to replace some of the second program code with replacement program code to handle the encrypted data in an application-specific manner, other than purging, when said one or more encryption keys have changed.

13. The computing device of claim 1 wherein the computing device is a mobile computing device.

14. A computer-implemented method performed on a computing device, the method comprising:
storing in a memory of the computing device an application that uses a model-view-controller design pattern, and which comprises a model component, a controller component, and a viewer component, the model component implemented using a model framework,
the model framework comprising one or more first application programming interfaces (APIs) that provide application specific configuration data to first program code comprising the model framework, which, when executed by the computing device, causes the model component to use the application specific configuration data,
the model framework comprising one or more second APIs to alter processing in second program code comprising the model framework, wherein the second program code, which, when executed by the computing device, causes the model component to exhibit default behavior, wherein the second program code having one or more changed properties, when executed by the computing device, causes the model component to exhibit one or more changes in the default behavior,
the model framework comprising one or more third APIs to provide create, read, update, and delete (CRUD) program code to the model framework that is specific to data objects of the application, wherein the CRUD program code, when executed by the computing device, causes the computing device to manage the data objects in a manner that is specific to the application.

15. The computer-implemented method of claim 14 wherein the first APIs include APIs that:
define application specific data objects;
specify one or more key fields to identify application specific data; and
specify one or more Internet addresses for communicating with one or more backend servers over a communication network to access data.

16. The computer-implemented method of claim 15 wherein the Internet addresses include a first Internet address for retrieving data and a second Internet address for updating data.

17. The computer-implemented method of claim 14 wherein the second APIs include APIs that:
change a default behavior of expiring data after passage of a first time period to expiring data after passage of a second time period;
change the behavior of how data is stored and accessed in the computing device; and
select whether or not to send a notification to the controller component or to the viewer component when a state of data stored in the computing device has changed.

18. The computer-implemented method of claim 14 wherein the default behavior includes purging the data when conditions including a change in location of the computing device, low memory, or a change in one or more encryption keys arise, wherein the second APIs include APIs that change how the data is handled when one or more of the conditions arise.

19. A non-transitory computer readable storage medium having stored thereon computer program code that implements an application, the application using a model-view-controller design pattern and comprising a model component, a controller component, and a viewer component, the model component implemented using a model framework,
the model framework comprising one or more first application programming interfaces (APIs) that provide application specific configuration data to first program code comprising the model framework, which, when executed by a CPU, causes the model component to use the application specific configuration data, the model framework comprising one or more second APIs to alter processing in second program code comprising the model framework, wherein the second program code, which, when executed by the CPU, causes the model component to exhibit default behavior, wherein the second program code having one or more changed properties, when executed by the CPU, causes the model component to exhibit one or more changes in the default behavior, the model framework comprising one or more third APIs to provide create, read, update, and delete (CRUD) program code to the model framework that is specific to data objects of the application, wherein the CRUD program code, when executed by the CPU, causes the CPU to manage the data objects in a manner that is specific to the application.

20. The non-transitory computer readable storage medium of claim 19 being stored on a mobile computing device.

\* \* \* \* \*